United States Patent
Lin

(10) Patent No.: US 6,932,691 B1
(45) Date of Patent: Aug. 23, 2005

(54) FILM VALVE ASSEMBLY FOR A HEATING, VENTILATION AND AIR CONDITIONING SYSTEM

(75) Inventor: Paul Lin, Yung-Kang (TW)

(73) Assignee: Macauto Industrial Co., Ltd., Yung-Kang (TW)

( * ) Notice: Subject to any disclaimer, the term of this patent is extended or adjusted under 35 U.S.C. 154(b) by 0 days.

(21) Appl. No.: 10/855,700

(22) Filed: May 28, 2004

(51) Int. Cl.$^7$ .................................. B60H 1/02

(52) U.S. Cl. .................. 454/69; 251/901; 454/156

(58) Field of Search .................. 454/69, 121, 156, 454/159, 160, 161; 251/901; 165/42, 43

(56) References Cited

U.S. PATENT DOCUMENTS 5,885,152 A * 3/1999 Wardlaw .................. 454/121
6,616,060 B2 * 9/2003 Parisi et al. ............ 237/12.3 B

* cited by examiner

*Primary Examiner*—Harold Joyce
(74) *Attorney, Agent, or Firm*—Lowe, Hauptman & Berner, LLP

(57) ABSTRACT

A film valve assembly for a heating, ventilation and air conditioning system includes a frame, two roller mechanisms disposed on the frame, and a film valve disposed between the roller mechanisms under tension. A tension unit includes a tension rod having two ends that are connected respectively to first and second supporting seats on the base wall by first and second retaining units. The first retaining unit includes a spring-biased retaining element that is biased to engage a retaining hole in the first supporting seat.

10 Claims, 10 Drawing Sheets

FILM VALVE ASSEMBLY FOR A HEATING, VENTILATION AND AIR CONDITIONING SYSTEM

BACKGROUND OF THE INVENTION

1. Field of the Invention

This invention relates to a film valve assembly, and more particularly to a film valve assembly for a heating, ventilation and air conditioning system.

2. Description of the Related Art

Referring to FIGS. 1 and 2, a heating, ventilation, and air conditioning system 1 disclosed in U.S. Pat. No. 6,616,060 is shown to include a housing 11, an evaporator 12 disposed in the housing 11, a heater 13 disposed in the housing 11, and a film valve assembly 2 disposed on the housing 11.

Referring to FIGS. 2 and 3, the film valve assembly 2 includes a frame 21 disposed on a housing 1, first and second roller mechanisms 22, 23 disposed respectively on two opposite sides of the frame 21, two tension rod units 24 disposed on the frame 21, and a film valve 25 having two ends 251 adhered respectively to the first and second roller mechanisms 22, 23. The frame 21 has a plurality of vent holes (not shown). The film valve 25 also has a plurality of vent holes 252.

The first roller mechanism 22 includes a mounting shaft 221 disposed fixedly on the frame 21, a rotating tube 222 sleeved rotatably on the mounting shaft 221, and a biasing member 223 for biasing the rotating tube 222 to rotate in a first direction. The second roller mechanism 23 is similar to the first roller mechanism 22 in construction except that the second roller mechanism 23 is biased to rotate in a second direction that is opposite to the first direction. Therefore, the film valve 25 is disposed between the first and second roller mechanisms 22, 23 under tension.

Referring to FIGS. 2 and 4, each of the tension rod units 24 includes two retaining members 241 made of a plastic material, and a tension rod 242. Each of the retaining members 241 has a shoulder 243, a skirt 244 press fitted within the tension rod 242, and a neck 245 inserted into a hole 212 in a sidewall 211 of the frame 21. During assembly, the skirt 244 is inserted into the tension rod 242. Subsequently, the neck 245 is inserted into the hole 212 in the sidewall 211. In this manner, the tension rods 242 are fixed to the frame 21 so as to permit extension of the film valve 25 between a base wall 210 of the frame 21 and the tension rods 242. However, it is difficult to insert the necks 245 of the retaining members 241 into the holes 212 in the sidewalls 211 during assembly. Furthermore, after assembly, the necks 245 of the retaining members 241 are prone to move within the holes 212 in the sidewalls 211. As a result, the tension rods 242 cannot be connected firmly to the frame 21. In addition, the film valve 25 is easily separated from the roller mechanisms 22, 23 due to the adhesive connection therebetween.

SUMMARY OF THE INVENTION

The object of this invention is to provide a film valve assembly for a heating, ventilation, and air conditioning system that can overcome the above-mentioned drawbacks associated with the prior art.

According to this invention, a film valve assembly for a heating, ventilation and air conditioning system includes a frame, two roller mechanisms disposed on the frame, and a film valve disposed between the roller mechanisms under tension. A tension unit includes a tension rod having two ends that are connected respectively to first and second supporting seats on the base wall by first and second retaining units. The first retaining unit includes a spring-biased retaining element that is biased to engage a retaining hole in the first supporting seat.

The spring-biased retaining element of the first retaining unit can be easily inserted into the retaining hole in the first supporting seat of the frame during assembly, and is not able to move within the same after assembly. A firm connection between the tension rod and the first supporting seat is therefore established.

In one preferred embodiment, each of the roller mechanisms includes a mounting shaft disposed fixedly on the frame, and a rotating tube sleeved rotatably on the mounting shaft and having an open-ended axial slot. A valve portion of the film valve extends through the axial slots in the rotating tubes of the roller mechanisms. The film valve further includes two end films fastened respectively to two opposite sides of the valve portion and disposed respectively within the rotating tubes of the roller mechanism. Each of the end films has a V-shaped cross-section, and includes two film portions that have respectively two interconnected sides connected fixedly to a corresponding one of the sides of the valve portion of the film valve. In each of the end films, the two film portions are sized so as to be prevented from moving through the axial slot in the rotating tube of a corresponding one of the roller mechanisms, thereby retaining the film portions within the rotating tube of the corresponding one of the roller mechanisms. This can prevent separation of the film valve from the roller mechanisms.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
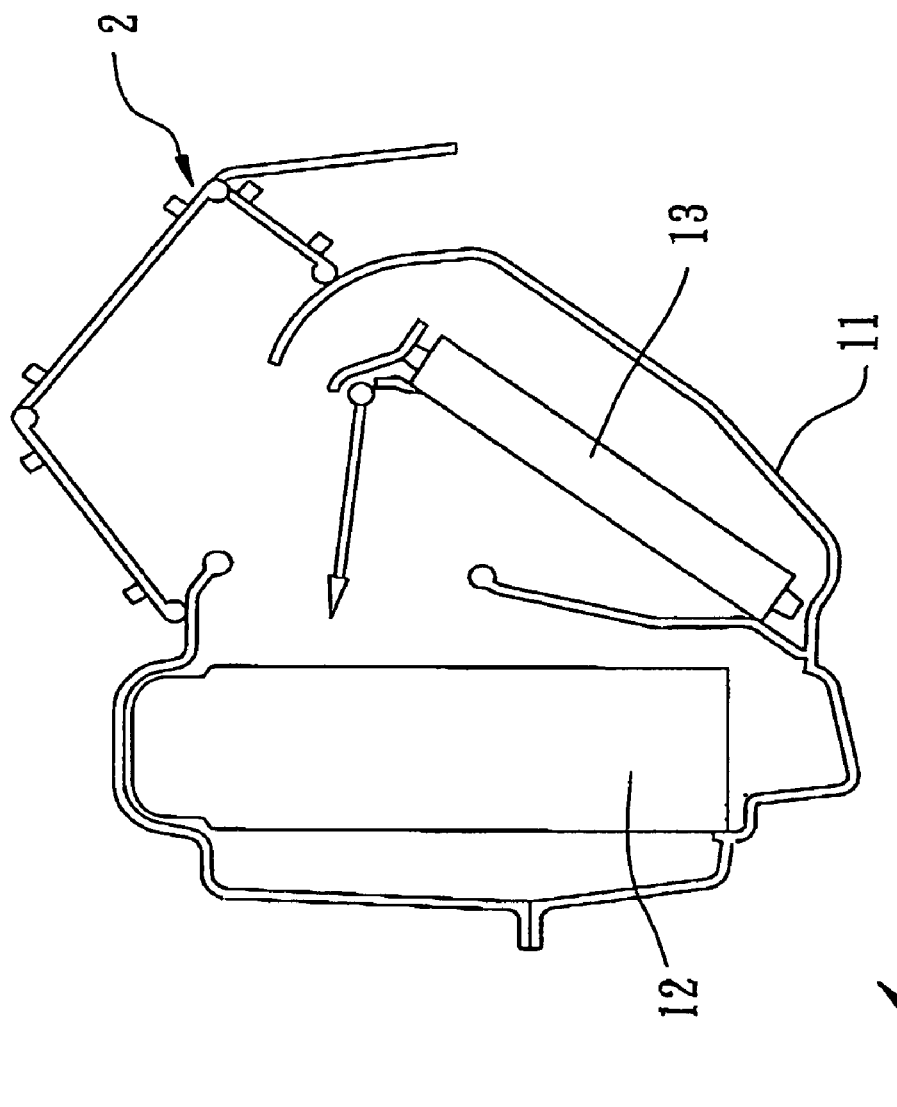
FIG. 1 is a side view of a heating, ventilation, and air conditioning system disclosed within U.S. Pat. No. 6,616,060.
Figure 2:
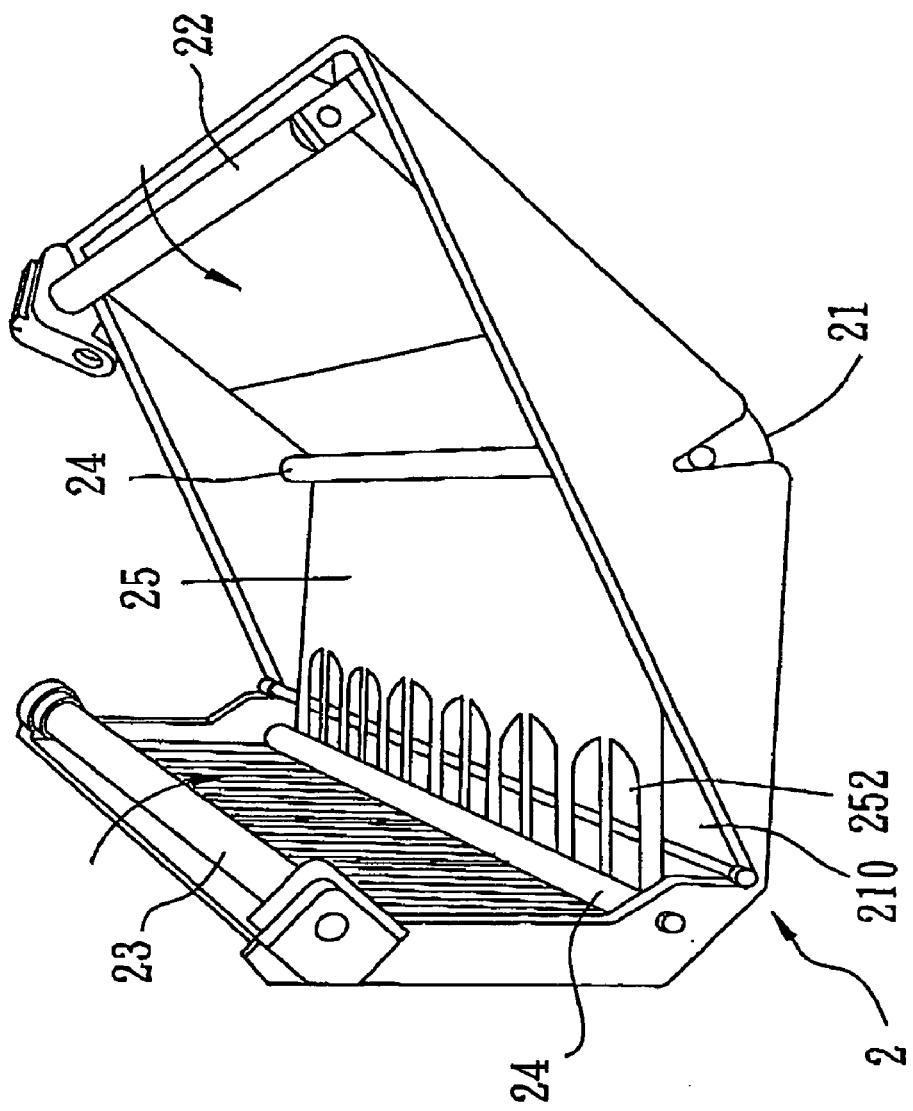
FIG. 2 is a perspective view of a film valve assembly of the system disclosed within U.S. Pat. No. 6,616,060.
Figure 3:
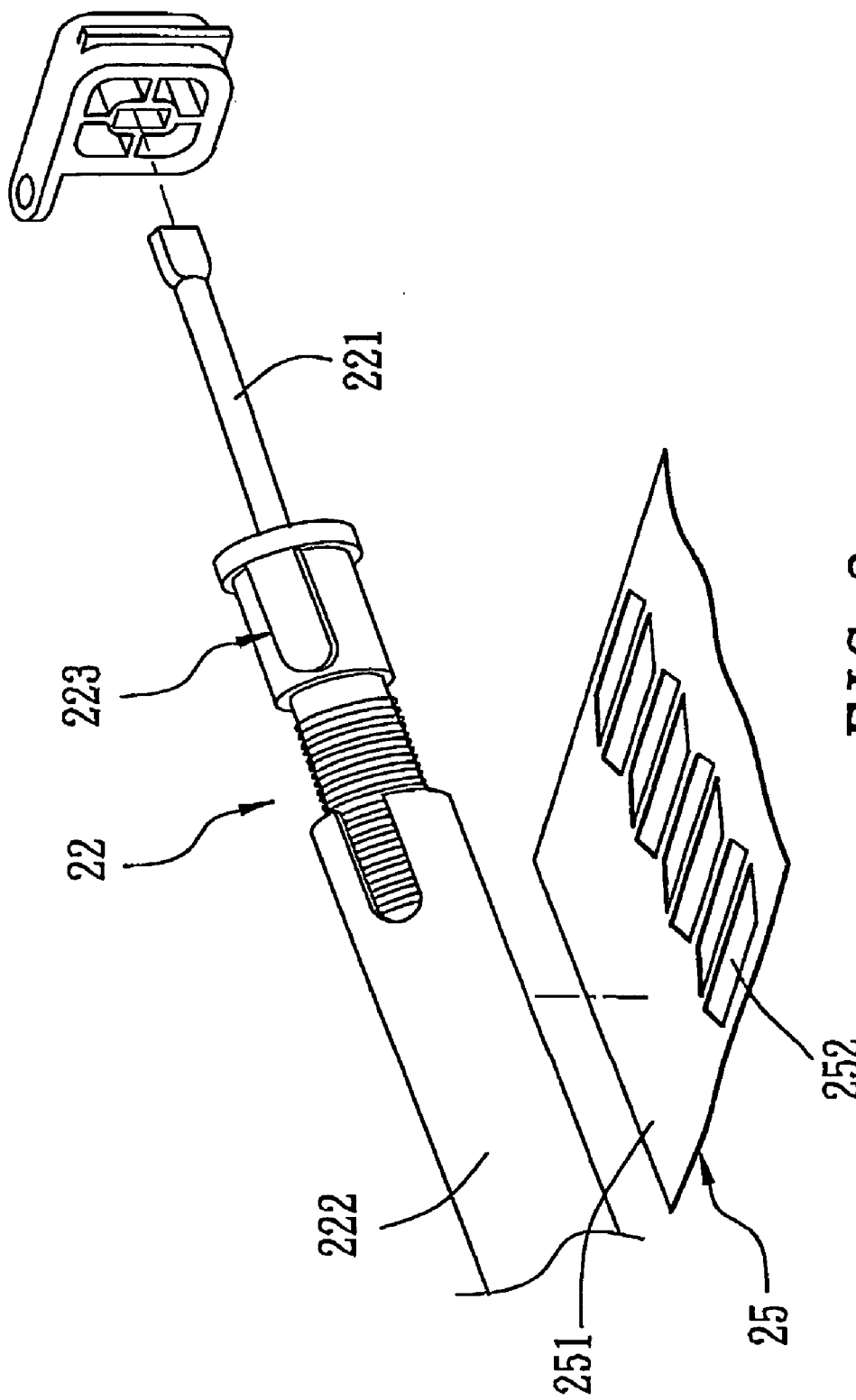
FIG. 3 is a fragmentary exploded perspective view of a first roller mechanism and a film valve of the system disclosed within U.S. Pat. No. 6,616,060.
Figure 4:
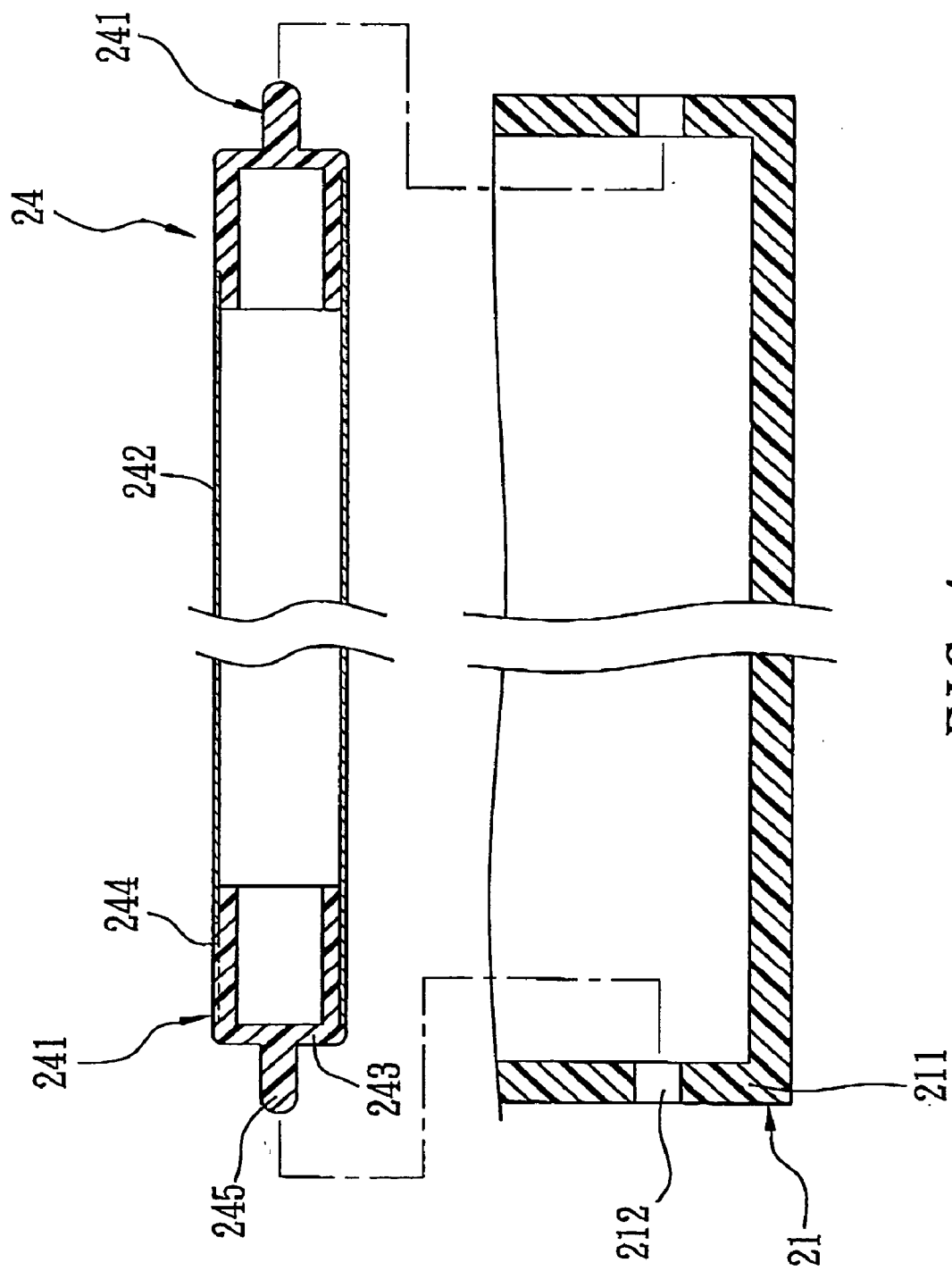
FIG. 4 is a schematic sectional view illustrating how a tension rod is mounted to two sidewalls of a frame in the film valve assembly of the system disclosed within U.S. Pat. No. 6,616,060.
Figure 5:
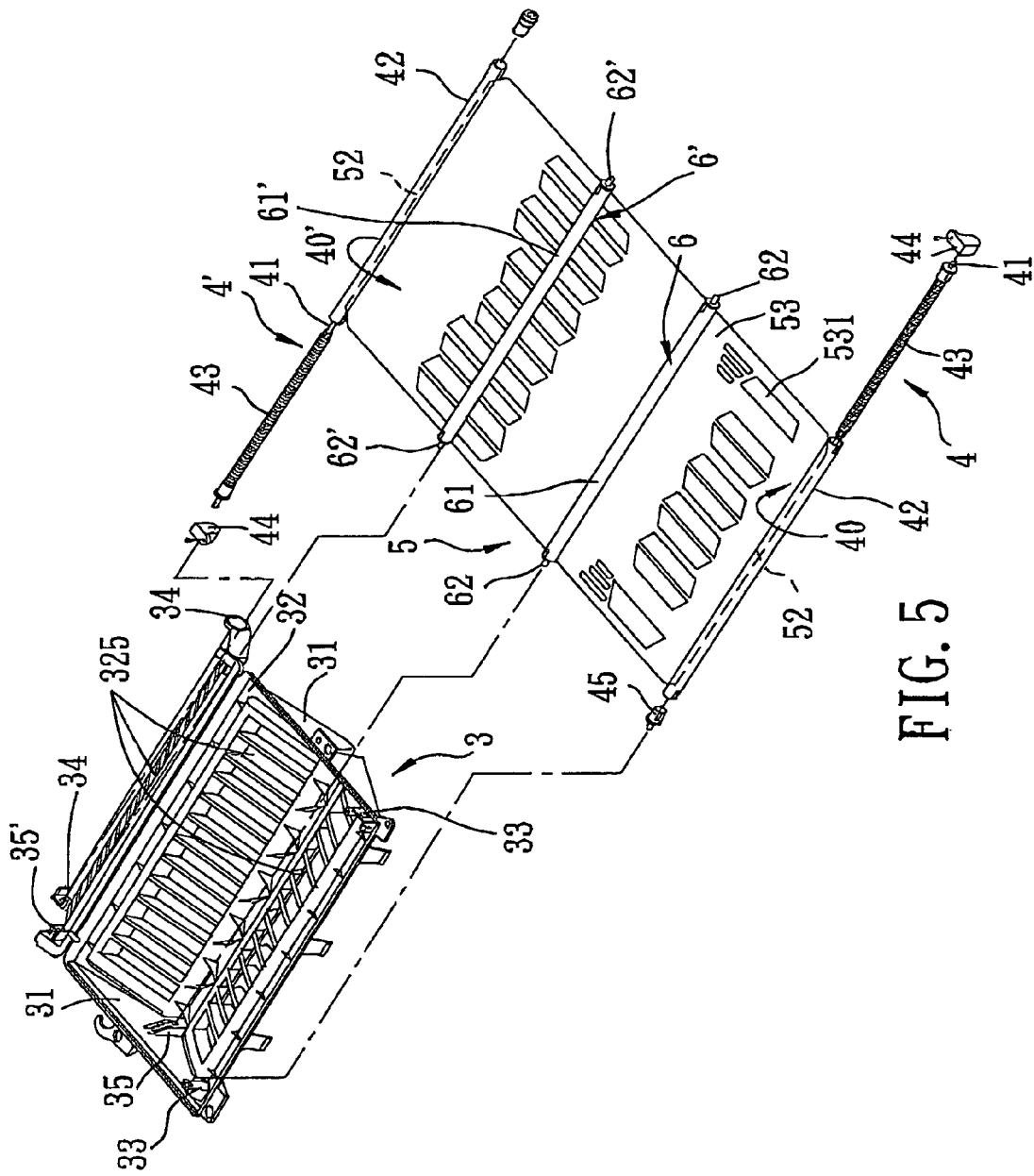
FIG. 5 is a partly exploded perspective view of the preferred embodiment of a film valve assembly for a heating, ventilation, and air conditioning system according to this invention.
Figure 6:
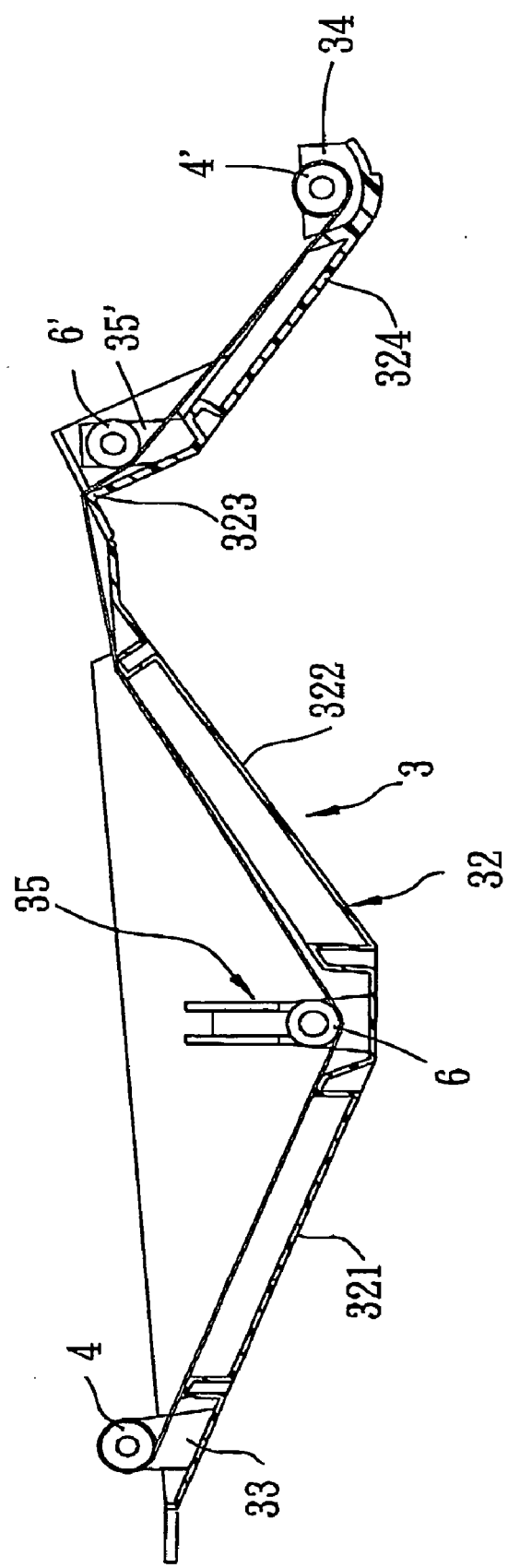
FIG. 6 is a sectional view of the preferred embodiment.

Referring to FIGS. 5 and 6, the preferred embodiment of a film valve assembly for a heating, ventilation, and air conditioning system according to this invention is shown to include a frame 3, a pair of first and second roller mechanisms 4, 4', a film valve 5, and a tension unit consisting of first and second tension subunits 6, 6'.

The frame 3 includes a pair of left and right sidewalls 31, a base wall 32 interconnecting the left and right sidewalls 31, a pair of first shaft-mounting seats 33, a pair of second shaft-mounting seats 34, a pair of first and second supporting seats 35 (only one is shown), and a pair of third and fourth supporting seats 35' (only one is shown).

The base wall 32 is disposed between the left and right sidewalls 31, and has a planar first wall portion 321, a planar second wall portion 322, a folding line 323, a third wall portion 324, and a plurality of vent holes 325. The second wall portion 322 is connected fixedly to the first wall portion 321 such that an obtuse angle is formed therebetween. The third wall portion 324 is connected to the second wall portion 322 at the folding line 323. The folding line 323 is adapted to enable the third wall portion 324 to swing relative to the second wall portion 322 so as to permit the stable mounting of the film valve assembly to a housing (not shown) of the heating, ventilation, and air conditioning system.

The first shaft-mounting seats 33 are disposed at a side of the first wall portion 321 of the base wall 31 of the frame 3 distal from the second wall portion 322. The second shaft-mounting seats 34 are disposed at a side of the third wall portion 324 of the base wall 32 distal from the second wall portion 322.

The first and second supporting seats 35 project from the base wall 22 of the frame 3, are located between the first and second wall portions 321, 322, and are adjacent respectively to the left and right sidewalls 31.

Figure 7:
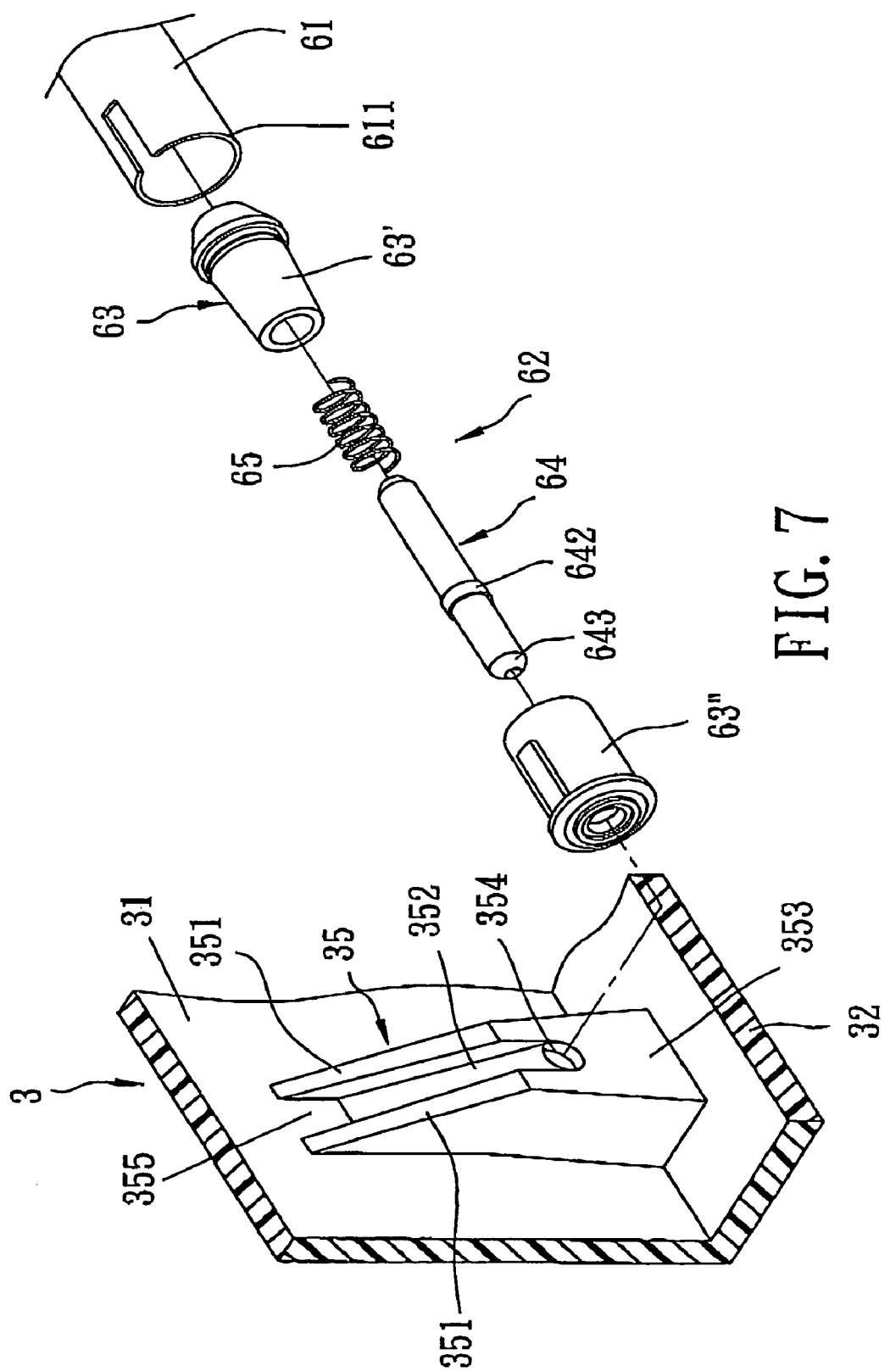
FIG. 7 is an exploded perspective view of a retaining unit and a supporting seat of the preferred embodiment.

Referring to FIG. 7, the first and second supporting seats 35 are formed integrally with the base wall 32 and the left and right sidewalls 31, and each includes two vertical limiting walls 351, an inclined guide wall 352, a vertical retaining wall 353, and a circular retaining hole 354. The retaining wall 353 extends upwardly from the base 32, and is parallel to the left and right sidewalls 31. The retaining hole 354 is formed through an upper portion of the retaining wall 353. The limiting walls 351 extend respectively and perpendicularly from two opposite sides of the retaining wall 353, are formed integrally with the corresponding one of the left and right sidewalls 31, and flank the retaining hole 354 in the retaining wall 353. The guide wall 352 is disposed immediately above the retaining hole 354, and has two opposite sides formed respectively and integrally with the limiting walls 351, an upper end formed integrally with the corresponding one of the left and right sidewalls 31, and a lower end formed integrally with an upper end portion of the retaining wall 353. A guide slot 355 is defined among the guide wall 352 and the limiting walls 351, and has a width that corresponds approximately to the diameter of the retaining hole 354.

The first tension subunit 6 includes a tubular first tension rod 61 disposed between the first and second supporting seats 35, and a pair of first and second retaining units 62 (only one is shown in FIG. 7) connected respectively to two ends 611 of the first tension rod 61 and to the first and second supporting seats 35.

Figure 9:
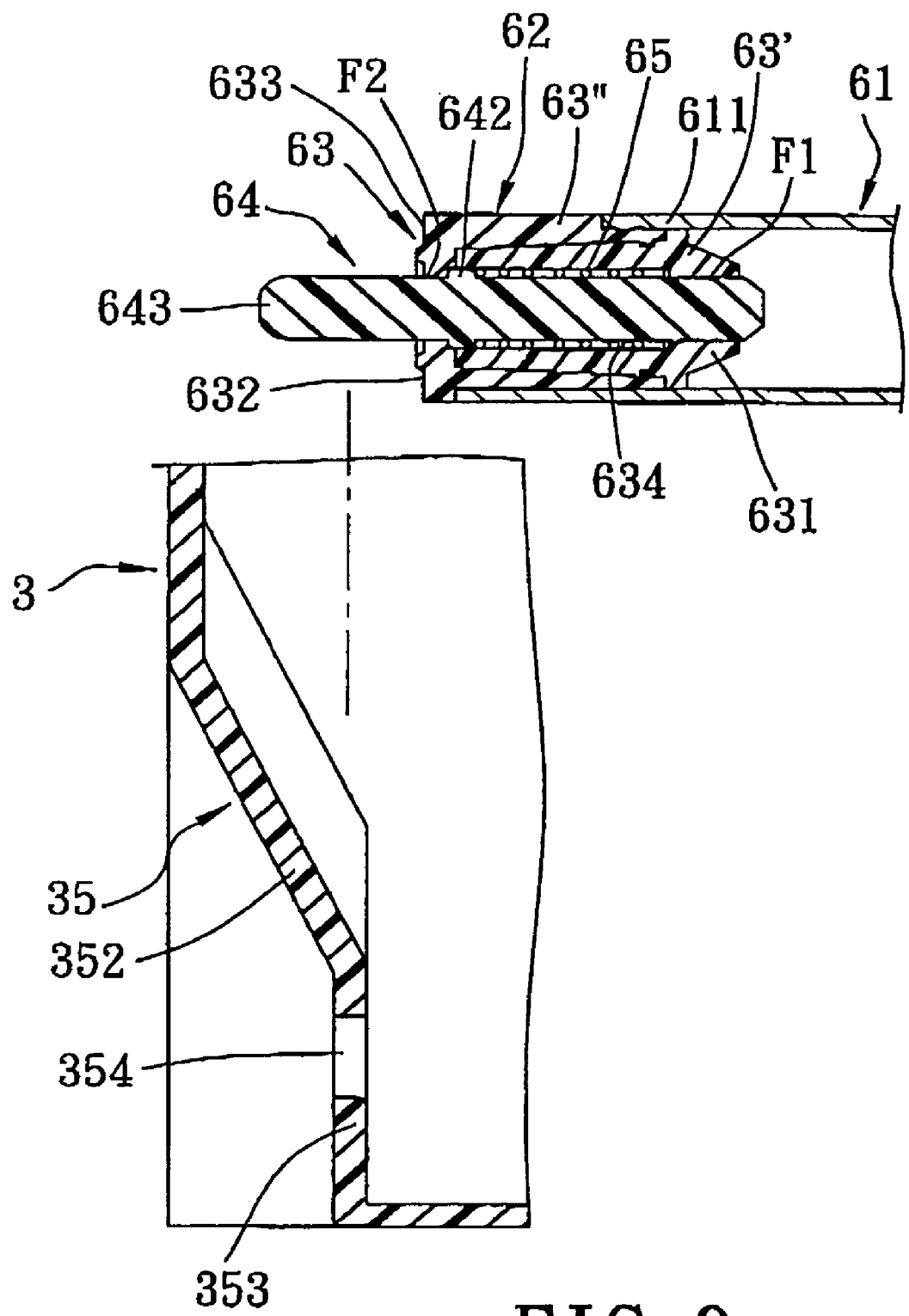
FIG. 9 is an exploded sectional view of the retaining unit and the supporting seat of the preferred embodiment, illustrating how a retaining element is disposed at a normal position relative to a tension rod.

Referring to FIGS. 7 and 9, each of the first and second retaining units 62 includes an insert tube unit 63, a retaining element 64 configured as a rod, and a coiled compression spring 65. The insert tube unit 63 consists of an inner tube 63' and an outer tube 63" sleeved on the inner tube 63', and has an inner end 631 that is press fitted within the first tension rod 61 and that is formed with a first inward flange (F1) extending radially and inwardly therefrom, a shoulder 632, and an outer end 633 that is formed with a second inward flange (F2) extending radially and inwardly therefrom. The retaining element 64 extends through the insert tube unit 63, and has an intermediate portion that is formed with an outward flange 642 extending radially and outwardly therefrom, and a rounded outer end 643. As a consequence, a spring-receiving space 634 is defined between the insert tube unit 63 and the retaining element 64, and between the first and second inward flanges (F1, F2) of the insert tube unit 63. The outward flange 642 of the retaining element 64 extends into the spring-receiving space 634 in the insert tube unit 63. The spring 65 is disposed within the spring-receiving space 634 in the insert tube unit 63, and presses the outward flange 642 of the retaining element 64 against the second inward flange (F2) of the insert tube unit 63. Thus, the outer end 643 of the retaining element 64 is biased to move away from the first tension rod 61 and into the retaining hole 354 in a corresponding one of the first and second supporting seats 35.

Figure 10:
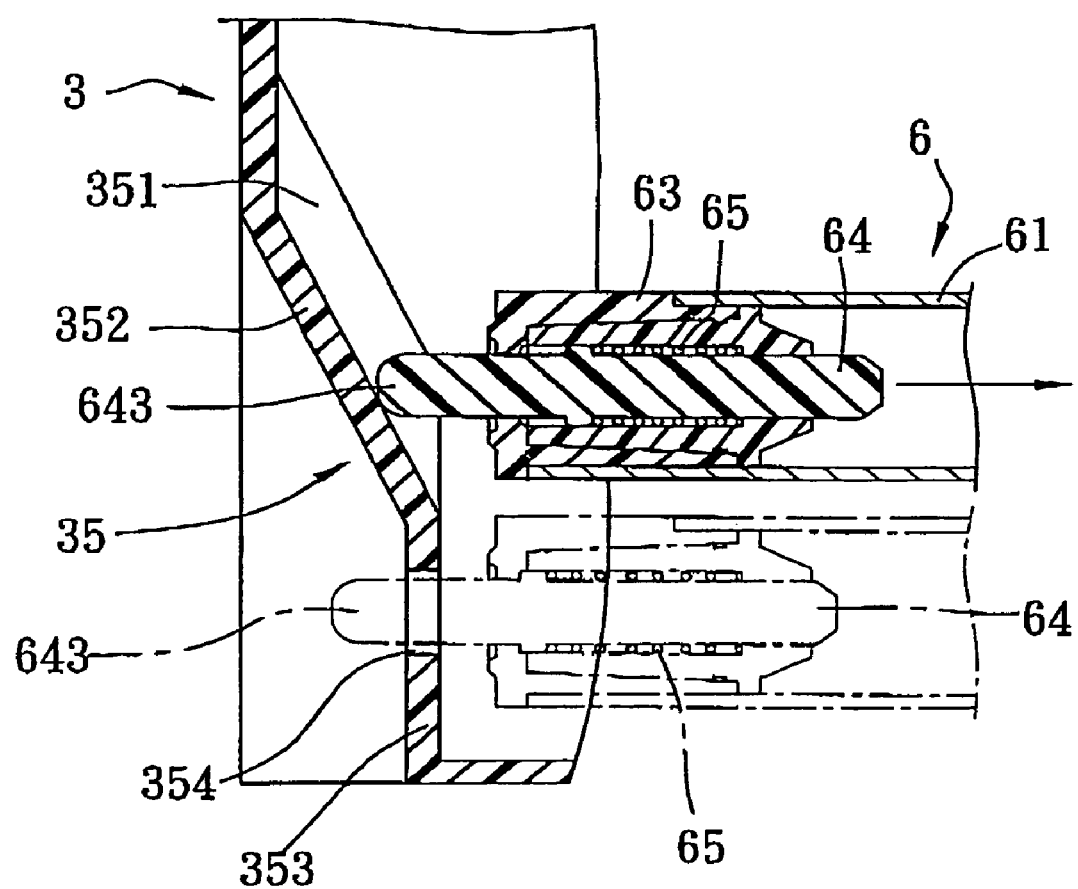
FIG. 10 is a sectional view of the retaining unit and the supporting seat of the preferred embodiment, illustrating how the retaining element is moved relative to the tension rod during assembly.

When it is desired to mount the first retaining unit 62 to the first supporting seat 35, the first retaining unit 62 is moved to a position directly over the first supporting seat 35, as shown in FIG. 9. Subsequently, an assembly of the first retaining unit 62 and the first tension rod 61 is moved downward so as to slide the outer end 643 of the retaining element 64 over the guide wall 352. During movement of the outer end 643 of the retaining element 64 along the guide slot 355, the retaining element 64 is pressed by the guide wall 352 to move relative to the first tension rod 61 in a direction shown by the arrow in FIG. 10. Continuous downward movement of the assembly of the first retaining unit 62 and the first tension rod 61 will cause the outer end 643 of the retaining element 64 to align with the retaining hole 354 in the first supporting seat 35. At the same time, the spring 65 biases the outer end 643 of the retaining element 64 to engage the retaining hole 354 in the first supporting seat 35, as shown in FIG. 10. It is evident from the above description that the first tension subunit 6 of the tension unit is easily mounted to the first and second supporting seats 35.

Alternatively, the retaining element 64 of the second retaining unit 62 of the first tension subunit 6 may be connected fixedly to the first tension rod 61, while the retaining element 64 of the first retaining unit 62 is left remaining movably connected as described above. In this case, the provision of the spring-biased retaining element 64 of the first retaining unit 62 of the first tension subunit 6 is sufficient to enable the first tension subunit 6 to be easily mounted to the first and second supporting seats 35.

Again referring to FIGS. 5 and 6, the third and fourth supporting seats 35' project respectively from left and right sides of the third wall portion 324, are adjacent respectively to the left and right sidewalls 31, and are disposed in proximity to the second wall portion 322. The third and fourth supporting seats 35' are similar to the first and second supporting seats 35 in structure, while the second tension subunit 6' is similar to the first tension subunit 6 in structure. The second tension subunit 6' includes a second tension rod 61', and is connected to the third and fourth supporting seats 35' by third and fourth retaining units 62' in a manner similar to the connection of the first tension rod 61 to the first and second supporting seats 35.

Figure 8:
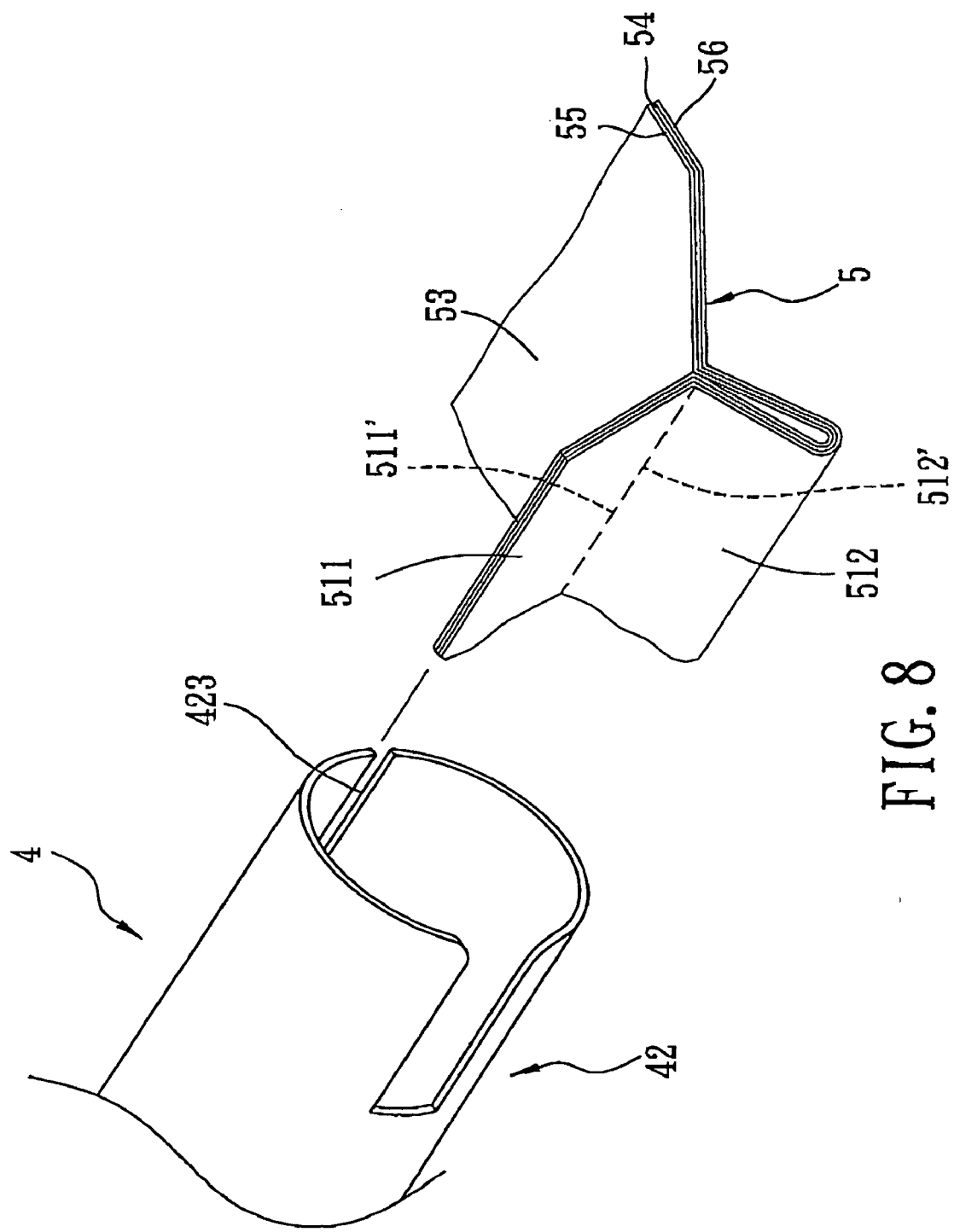
FIG. 8 is a fragmentary exploded perspective view of a rotating tube of a roller mechanism and an end film of a film valve of the preferred embodiment.

Referring to FIGS. 5 and 8, the first roller mechanism 4 includes a mounting shaft 41 disposed fixedly between the first shaft-mounting seats 33, a rotating tube 42 sleeved rotatably on the mounting shaft 41 and having an open-ended axial slot 423, a biasing member 43 configured as a coiled spring so as to bias the rotating tube 42 to rotate on the mounting shaft 41 in a direction 40, a fixed cap 44 sleeved fixedly on one end of the mounting shaft 41, and an adjustable cap 45 sleeved rotatably on the other end of the mounting shaft 41 and rotatable relative to the mounting shaft 41 so as to change the magnitude of the biasing force of the biasing member 43. The second roller mechanism 4' is similar to the first roller mechanism 4 in structure except that the biasing member 43 of the second roller mechanism 4' biases the rotating tube 42 to rotate on the mounting shaft 41 in a direction 40' that is opposite to the direction 40. The film valve 5 includes two end films 51, 52 and a valve portion 53 that is formed with a plurality of vent holes 531 therethrough. The end films 51, 52 have substantially the same structure, and are fastened respectively to two opposite sides of the valve portion 53. The valve portion 53 of the film valve 5 extends through the axial slot 423 in the rotating tube 42 of the first roller mechanism 4. The end film 51 has a V-shaped cross-section, is disposed within the rotating tube 43 of the first mechanism 4, and includes two film portions 511, 512 that have respectively two interconnected sides 511', 512' which are connected fixedly to the corresponding side of the valve portion 53. The total thickness of the film portions 511, 512 of the end film 51 is larger than the width of the axial slot 423 in the rotating tube 42 of the first roller mechanism 4. Therefore, the film portions 511, 512 of the end film 51 are not able to move through the axial slot 423 in the rotating tube 42 of the first roller mechanism 4, and are therefore retained within the rotating tube 42 of the first roller mechanism 4. The first and second roller mechanisms 4, 4' are connected to the film valve 5 in the same manner. As a consequence, removal of the film valve 5 from the first and second roller mechanisms 4, 4' is effectively prevented.

The valve portion 53 of the film valve 5 is confined between the base wall 32 of the frame 3 and the first and second tension rods 61, 61' of the first and second tension subunits 6, 6', and has a base layer 54 made of glass fiber, and two coating layers 55, 56 coated respectively on two opposite side surfaces of the base layer 54, as shown in FIG. 8. The coating layer 55 is made of silicon. The coating layer 56 is made of silicon or polyurethane.

With this invention thus explained, it is apparent that numerous modifications and variations can be made without departing from the scope and spirit of this invention. It is therefore intended that this invention be limited only as indicated by the appended claims.

I claim:

1. A film valve assembly for a heating, ventilation and air conditioning system comprising:
    a frame including a pair of left and right sidewalls, a base wall interconnecting and disposed between said left and right sidewalls, and a pair of first and second supporting seats projecting from said base wall and adjacent respectively to said left and right sidewalls, each of said first and second supporting seats being formed with a retaining hole;
    two roller mechanisms disposed respectively at two opposite sides of said base wall;
    a film valve disposed between and connected to said roller mechanisms and including a valve portion that is formed with at least one vent hole therethrough; and
    a tension unit including
        a first tension rod disposed between said first and second supporting seats of said frame, and
        a pair of first and second retaining units connected respectively to two ends of said first tension rod and to said first and second supporting seats of said frame, said first retaining unit including a spring-biased retaining element that is attached to said first tension rod and that is biased to move away from said first tension rod and into said retaining hole in said first supporting seat of said frame, said second retaining unit interconnecting said first tension rod and said second supporting seat of said frame so as to confine said valve portion of said film valve between said first tension rod and said base wall of said frame.

2. The assembly as claimed in claim 1, wherein said second retaining unit includes a spring-biased retaining element that is attached to said first tension rod and that is biased to move away from said first tension rod and into said retaining hole in said second supporting seat of said frame.

3. The assembly as claimed in claim 2, wherein each of said first and second supporting seats of said frame includes:
    a vertical retaining wall extending upwardly from said base wall of said frame and parallel to said left and right sidewalls, said retaining wall being formed with said retaining hole in a corresponding one of said first and second supporting seats of said frame;
    two vertical limiting walls extending respectively and perpendicularly from two opposite sides of said retaining wall and formed integrally with a corresponding one of said left and right sidewalls, said limiting walls flanking said retaining hole in the corresponding one of said first and second supporting seats of said frame; and
    an inclined guide wall disposed immediately above said retaining hole in the corresponding one of said first and second supporting seats of said frame and having two opposite sides formed respectively and integrally with said limiting walls, an upper end formed integrally with the corresponding one of said left and right sidewalls, and a lower end formed integrally with an upper end portion of said retaining wall so as to define a guide slot that is disposed among said guide wall and said limiting walls and that has a width which corresponds approximately to diameter of said retaining hole in the corresponding one of said first and second supporting seats of said frame, thereby permitting movement of a corresponding one of said retaining elements of said tension unit along said guide slot into said retaining hole in the corresponding one of said is first and second supporting seats.

4. The assembly as claimed in claim 1, wherein each of said roller mechanisms includes a mounting shaft disposed fixedly on said frame, a rotating tube sleeved rotatably on said mounting shaft and having an open-ended axial slot, and a biasing member, said biasing members biasing said rotating tubes of said roller mechanisms to rotate relative to said frame in opposite directions, said valve portion of said film valve extending through said axial slots in said rotating tubes of said roller mechanisms, said film valve further including two end films fastened respectively to two opposite sides of said valve portion and disposed respectively within said rotating tubes of said roller mechanisms, each of said end films having a V-shaped cross-section and including two film portions that have respectively two interconnected sides connected fixedly to a corresponding one of said sides of said valve portion of said film valve and that are sized so as to prevent said two film portions from moving through said axial slot in said rotating tube of a corresponding one of said roller mechanisms, thereby retaining said film portions within said rotating tube of the corresponding one of said roller mechanisms.

5. The assembly as claimed in claim 1, wherein said base wall of said frame has a planar first wall portion, a planar second wall portion connected fixedly to said first wall portion such that an angle is formed between said first and second wall portions, and a third wall portion connected swingably to said second wall portion.

6. The assembly as claimed in claim 5, wherein said frame further includes two pairs of shaft-mounting seats, one pair of said shaft-mounting seats being disposed at a side of said first wall portion of said base wall of said frame distal from said second wall portion of said base wall of said frame, the other of said shaft-mounting seats being disposed at a side of said third wall portion of said base wall of said frame distal from said second wall portion of said base wall of said frame.

7. The assembly as claimed in claim 5, wherein said first and second supporting seats are disposed between said first and second wall portions of said base wall of said frame.

8. The assembly as claimed in claim 5, wherein said frame further includes a pair of third and fourth supporting seats that project from said third wall portion of said base wall, that are adjacent respectively to said left and right sidewalls, and that are disposed in proximity to said second wall portion of said base wall of said frame, each of said third and fourth supporting seats being formed with a retaining hole, said tension unit further including a second tension rod disposed between said third and fourth supporting seats, and a pair of third and fourth retaining units connected respectively to two ends of said second tension rod and to said third and fourth supporting seats, said third retaining unit including a spring-biased retaining element that is attached to said second tension rod and that is biased to move away from said second tension rod and into said retaining hole in said third supporting seat, said fourth retaining unit interconnecting said second tension rod and said fourth supporting seat so as to confine said valve portion of said film valve between said second tension rod and said base wall of said frame.

9. The assembly as claimed in claim 1, wherein said first tension rod is tubular, said retaining element of said first retaining unit of said tension unit being configured as a rod that has an intermediate portion which is formed with an outward flange extending radially and outwardly therefrom, said tension unit further includes:

an insert tube unit having an inner end that is press fitted within said first tension rod and that is formed with a first inward flange extending radially and inwardly therefrom, and an outer end that is formed with a second inward flange extending radially and inwardly therefrom so as to define a spring-receiving space between said insert tube unit and said retaining element of said first retaining unit of said tension unit and is between said first and second inward flanges of said insert tube unit, said outward flange of said retaining element of said first retaining unit of said tension unit extending into said spring-receiving space; and a coiled compression spring disposed within said spring-receiving space so as to press said outward flange of said retaining element of said first retaining unit of said tension unit against said second inward flange of said insert tube unit, thereby inserting said retaining element of said first retaining unit of said tension unit into said retaining hole in said first supporting seat of said frame.

10. The assembly as claimed in claim 1, wherein said valve portion of said film valve has a base layer made of glass fiber, and two coating layers coated respectively on two opposite side surfaces of said base layer, one of said coating layers being made of silicon, the other of said coating layers being made of a material that is selected from the group consisting of silicon and polyurethane.

* * * * *